United States Patent [19]

Garner

[11] Patent Number: 5,449,195
[45] Date of Patent: Sep. 12, 1995

[54] CONSTANT DIAMETER INFLATOR RETAINER

[75] Inventor: Brett R. Garner, South Weber, Utah

[73] Assignee: Morton International, Inc., Chicago, Ill.

[21] Appl. No.: 189,013

[22] Filed: Jan. 28, 1994

[51] Int. Cl.⁶ ............................................. B60R 21/20
[52] U.S. Cl. .................. 280/728.2; 280/732; 248/56
[58] Field of Search ............ 280/728 A, 732, 736, 280/741, 731, 728 R, 730 R; 403/371, 372, 368, 289; 248/56, 316.7; 285/194, 205, 207; 16/2

[56] References Cited

U.S. PATENT DOCUMENTS

| | | | |
|---|---|---|---|
| 2,140,441 | 12/1938 | Clark | 248/56 |
| 2,140,443 | 12/1938 | Clark | 248/56 |
| 3,034,752 | 5/1962 | Pazmany | 248/56 |
| 4,291,905 | 9/1981 | Schrock | 248/56 |
| 4,299,363 | 11/1981 | Datschefski | 248/56 |
| 5,069,480 | 12/1991 | Good | 280/728 A |
| 5,096,222 | 3/1992 | Komerska et al. | 280/728 A |
| 5,141,247 | 8/1992 | Barth | 280/728 A |
| 5,152,549 | 10/1992 | Aird | 280/728 A |
| 5,197,756 | 3/1993 | Jarboe et al. | 280/728 A |
| 5,310,213 | 5/1994 | Mori | 280/728 A |
| 5,328,203 | 7/1994 | Baba et al. | 280/728 A |
| 5,342,084 | 8/1994 | Rose et al. | 280/728 A |

*Primary Examiner*—Eric D. Culbreth
*Assistant Examiner*—Peter C. English
*Attorney, Agent, or Firm*—Mark F. LaMaree; Charles N. Lovell; Gerald K. White

[57] ABSTRACT

A retainer for attaching an inflator having a substantially constant cross section to an air bag canister. The retainer comprises a base and a number of tabs perpendicular to the base. The tabs engage and hold the wall of the inflator. The base of the retainer is fastened to an air bag canister wall thereby securing one end of the inflator.

8 Claims, 3 Drawing Sheets

FIG. 4
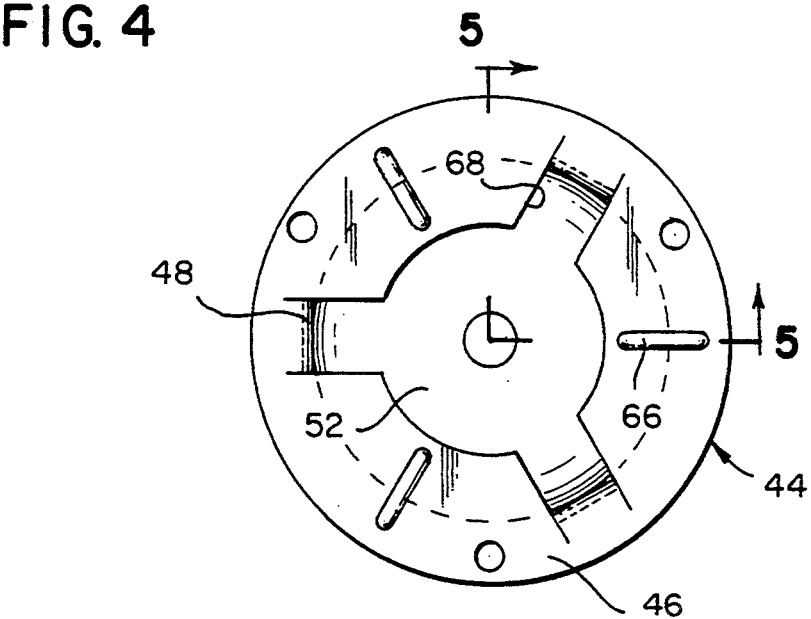
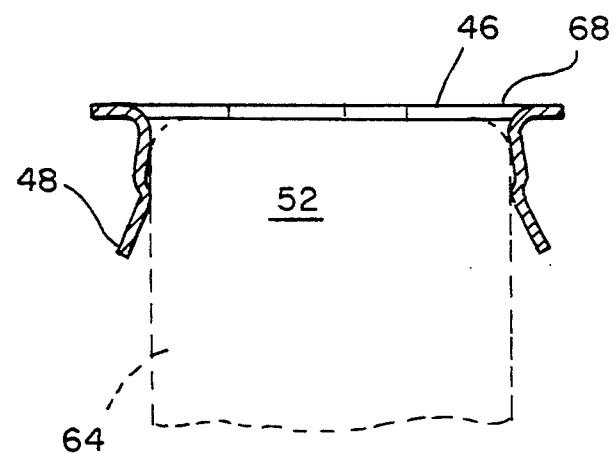
FIG. 5

CONSTANT DIAMETER INFLATOR RETAINER

BACKGROUND OF THE INVENTION

1. Field of the Invention

The present invention relates to an automotive safety device which, upon the onset of a collision, deploys an inflatable restraint cushion, commonly known as air bags, so as to provide impact protection to occupants of the passenger vehicles. More particularly, this invention relates to a device for securing an inflator having a constant cross section in a passenger side canister.

2. Description of Related Art

An air bag restraint system, referred to as a module, typically includes a canister which encloses a gas generator or, as it is commonly known, an inflator, and at least part of an air bag cushion, and a cover which conceals the module from view. When the vehicle is involved in a collision, a crash signal initiates operation of the inflator to cause the air bag cushion to deploy. The inflator produces an inert gas (e.g., nitrogen) which is directed under pressure into the air bag cushion to force it out of the canister incorporated into the module and into the passenger compartment of the vehicle. In a pyrotechnic-type inflator, gas is produced by the burning of a gas generating material. As the air bag cushion is forced out of the container, pressure exerted on the cover causes selected portions of the cover to separate in a predetermined manner along tear seams to enable the air bag cushion to be directed into the passenger compartment. As the air bag cushion is directed into the passenger compartment, it is inflated by the continued flow of gas produced by the inflator. One possible location for an air bag assembly is in the instrument panel or dashboard on the passenger side of the vehicle.

A standard pyrotechnic inflator 10 is shown in FIG. 1. The inflator 10 has an elongated tubular structure 12 with an open end 14 which is sealed with end cap 16 having flange 18, and a closed end 20 having an attached mounting stud 22 for attaching the inflator 10 to a canister 24. The pyrotechnic inflator 10 is installed in canister 24 by passing inflator 10 through opening 26 in the first side wall 28 and inserting mounting stud 22 through mounting aperture 30 formed in the second side wall 32 of canister 24 and securing mounting stud 22 with nut 34. The flange 18 is thereby engaged with opening 26 to secure both ends of the inflator 10. As passenger side inflator designs are modified to provide better performance, the outward appearance and therefore the procedure for installing the inflator may be changed. In one design, the mounting flange 18 is eliminated to form an inflator 10 of constant diameter to improve performance and the structural integrity of the inflator 10. With this modification, attachment of the passenger side inflator to conventional air bag canisters is not possible.

A possible solution is shown by Good, U.S. Pat. No. 5,069,480, wherein a recessed boss is provided for accepting the sealed end of an inflator. This design requires modification of the canister end panel thus requiring substantial retooling. Further, the recessed boss must be sized for one specific inflator diameter, thereby causing extensive changes should the inflator diameter be changed.

A second possible solution is shown in Jarboe et al., U.S. Pat. No. 5,197,756, wherein a sleeve having diametrically opposed flanges that extend outwardly of the sleeve is attached to a tongue formed into the air bag canister. The sleeve is connected to the inflator housing by press fit, shrink fit, or tongue-and-groove techniques. This design requires a specifically designed air bag canister. Further, the sleeve must be sized for each inflator.

SUMMARY OF THE INVENTION

An object of this invention is to provide a one-piece retainer means for attaching an inflator having a substantially constant cross section to an air bag canister.

Another object of this invention is to provide a retainer means which positions the end of the inflator while providing longitudinal and radial retention of the inflator and eliminates rattling due to vibration.

Another object of this invention is to provide sufficient access to the inflator for use with squib connectors.

These and other objectives of the invention, which will become apparent from the following description, have been achieved by a novel retainer for attaching an elongated tubular gas generator, for inflation of an automotive air bag cushion to an air bag canister. The elongated tubular gas generator contains, in part, an ignition means and a gas generating material. The gas generator is of substantially constant cross section, and has a smooth outer wall, a first end, and a second end. The gas generator second end has a substantially smooth base substantially perpendicular to the side wall. The gas generator is secured to an air bag canister that has an inside and an outside surface including a wall defining a cavity for the tubular gas generator and at least part of a folded automotive air bag cushion. The canister wall further defines an opening to the cavity in the canister, the gas generator being actuatable to generate a gas under pressure in the cavity. The retainer of the present invention comprises a base plate having a first surface and a second surface with a plurality of tabs substantially perpendicular to the first surface of the base plate. The tabs define a shape that conforms substantially to the second end of the gas generator, the shape being generally in the central region of the base plate. Selected portions of the base plate define a fastening structure which enables the retainer to be fastened to the wall of the air bag canister. The second end of the inflator is placed into the form defined by the tabs and the side wall adjacent to the second end of the inflator and is engaged and held into position by the tabs. The retainer is engaged with the wall of the air bag canister to secure the second end of the tubular gas generator to the air bag canister.

The gas generator may be cylindrical with a circular cross section or of any shape suitable to contain the gas generant and provide for the safe operation of the air bag module.

The retainer base may include raised sections which increase the structural rigidity of the base. The retainer base may be circular or any shape to provide for secure attachment of the retainer to the air bag canister. The retainer may be fastened to the canister wall with rivets, a threaded fastener and bolt, or any suitable fastener.

BRIEF DESCRIPTION OF THE DRAWINGS

With this description of the invention, a detailed description follows with reference being made to the accompanying figures of drawings which form part of the specification related thereto, in which like parts are designated by the same reference numbers, and of which:

FIG. 4 is a top plan view of the retainer illustrating the retainer of the present invention; and FIG. 5 is a pie-cut view of the retainer taken along segment 5—5 of FIG. 4 illustrating the overall shape of the retainer.

DETAILED DESCRIPTION OF THE INVENTION

Description of the Preferred Embodiments

Figure 1:
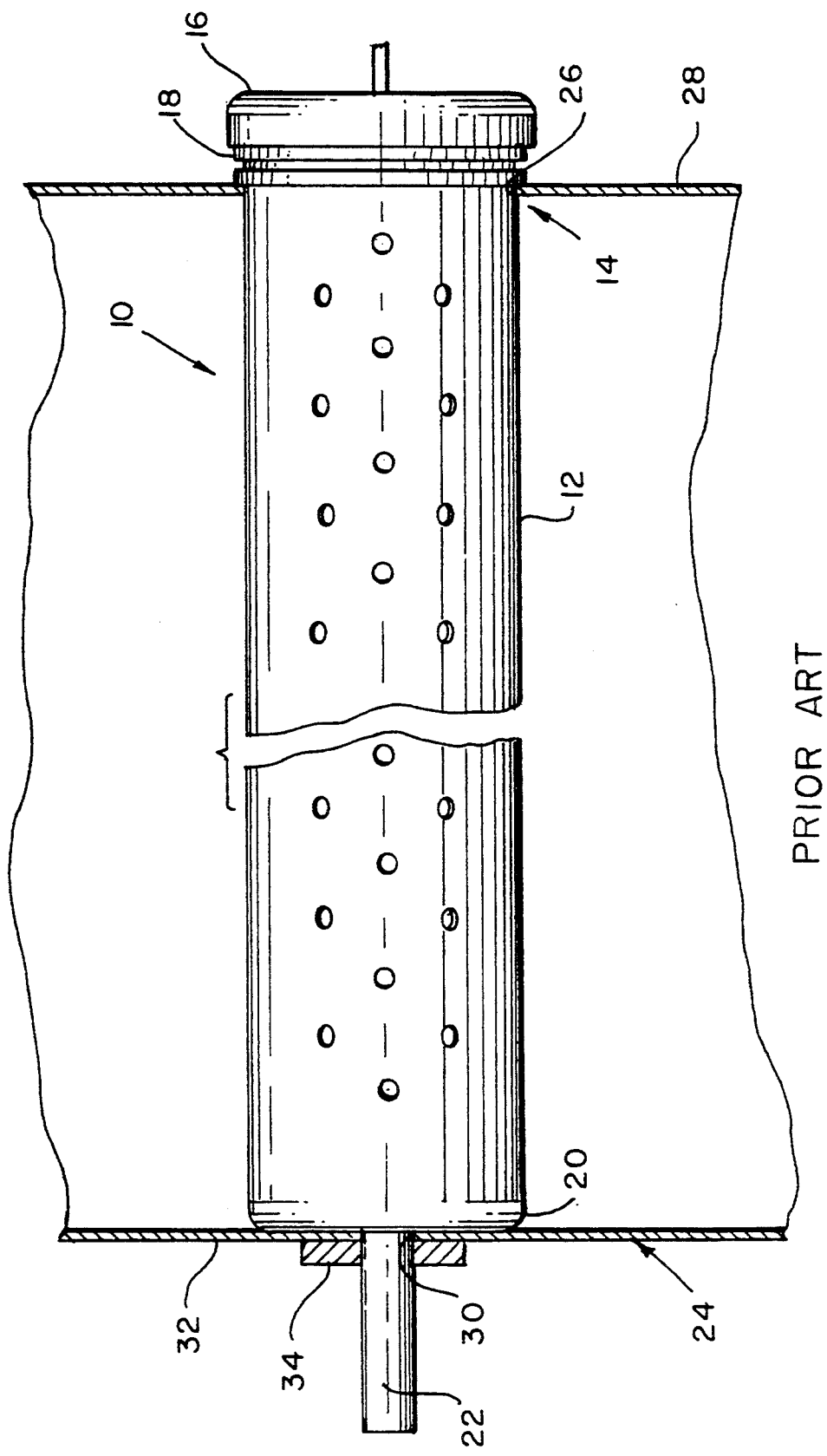
FIG. 1 is a cross-sectional view illustrating a conventional passenger side inflator.
Figure 2:
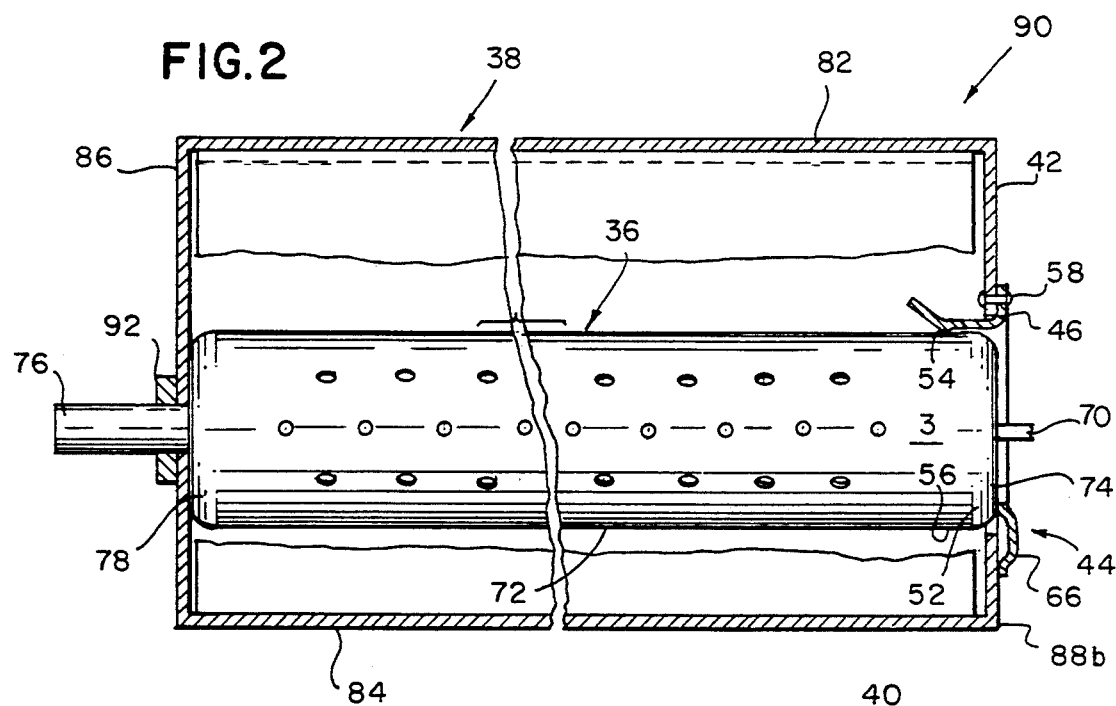
FIG. 2 is a top plan view illustrating the retainer of the present invention in use with a gas generator and air bag canister.
Figure 3:
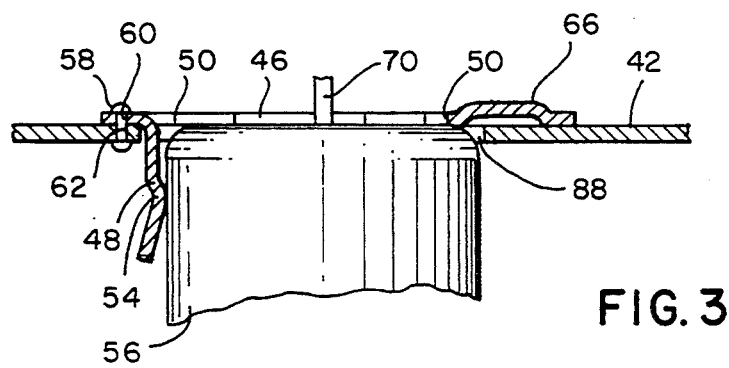
FIG. 3 is a detailed view of area 3 of FIG. 2 illustrating the retainer, gas generator, and side panel of the air bag canister.

Referring to FIG. 2, an improved gas generator 36 having a substantially constant cross section is shown installed in an air bag canister 38 provided with air bag cushion 40. The air bag cushion 40 is shown in fragmented view in order to simplify the drawing. The improved gas generator 36 does not have a flange for securing the gas generator 36 to the first side wall 42 of canister 38. A retainer 44 comprising a base plate 46 and tabs 48 substantially perpendicular to the first surface 50 of the base plate 46 is attached to the first end 52 of gas generator 36. The tabs 48 have an indented section 54 which contact and engage the side wall 56 of the gas generator 36 adjacent to the first end 52, as shown in FIG. 3. Once engaged by the tabs 48 the first end 52 of the gas generator 36 is held securely. Fastener means 58 pass through apertures 60 in the retainer base plate 46 and fastener apertures 62 in the first side wall 42 of canister 38 so that the second surface 51 of retainer base plate 46 is engaged with sidewall 42, thereby attaching the first end 52 of gas generator 36 to canister 38.

Figure 3A:
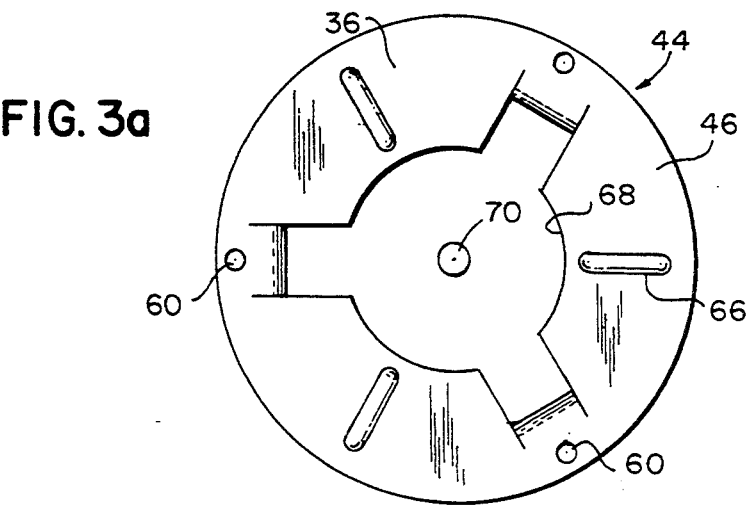
FIG. 3a is a top plan view of the retainer shown in FIG. 3.

The retainer 44, as shown in FIGS. 3a, 4, and 5, has a base plate 46 and a plurality of tabs 48 substantially perpendicular to the base plate 46. The tabs 48 define a shape 64 that conforms substantially to the second end 52 of the gas generator 36. A number of raised portions or stiffening ribs 66 can be provided to increase the structural rigidity of the base plate 46. A central aperture 68 is provided to permit access to the gas generator 36 so as to provide access to ignition squib 70, as shown in FIG. 3, should one be installed. The retainer 44 can be fabricated from carbon steel, spring steel, or stainless steel. The retainer can be formed by stamping technologies standardly known in the art.

The gas generator 36 for use with the retainer 44 of this invention is a constant cross section gas generator 36. The gas generator 36 comprises an elongated housing 72 of a substantially constant cross section having a second sealed end 78 with a mounting stud 76 attached thereto and a first end 74 with an ignition squib 70 mounted therein.

The canister 38 for use with the retainer 44 comprises a top wall 82 and a bottom wall 84 (when viewed from above), a first side wall 42, and a second side wall 86. A mounting stud opening (not shown) is provided in the second side wall 86 to accept the mounting stud 76 attached to the second sealed end 78 of gas generator 36. A gas generator aperture 88, as shown in FIG. 3, is provided in the first side wall 42 through which aperture 88 the gap generator 36 is inserted during assembly of the passenger side air bag module shown generally at 90 in FIG. 2.

During assembly of the passenger side air bag module 90 the retainer 44 of this invention is attached to the second end 52 of gas generator 36 such that tabs 48 engage the side wall 56. The gas generator 36 is inserted such that mounting stud 76 passes through the mounting stud opening and the mounting stud 76 is secured with nut 92. Fastener means 58 are then inserted through fastener apertures 60 of retainer base plate 46 and fastener apertures 62 in the first side wall 42 of canister 38, thereby securing the gas generator 36 in canister 38. The retainer 44 holds the gas generator 36 in place without further attachment means and prevents movement and rattling caused by vibration of the vehicle.

Thus, in accordance with the invention, there has been provided a one-piece retainer means for attaching an inflator having a substantially constant cross section to an air bag canister. There has also been provided a retainer means which positions the end of the inflator while providing longitudinal and radial retention of the inflator and eliminates rattling due to vibration while providing sufficient access to the inflator for use with squib connectors.

With this description of the invention in detail, those skilled in the art will appreciate that modification may be made to the invention without departing from the spirit thereof. Therefore, it is not intended that the scope of the invention be limited to the specific embodiments that have been illustrated and described. Rather, it is intended that the scope to the invention be determined by the scope of the appended claims.

I claim:

1. An air bag restraint inflator assembly comprising:
   a cylindrical tubular gas generator including an ignition means, said generator having a smooth outer side wall, a first end, and a second end, wherein said second end has a substantially smooth base substantially perpendicular to said side wall;
   an air bag canister having a wall structure, a portion of said wall structure defining a deployment opening for an air bag; and
   a retainer comprising a base plate with a first surface and a second surface with means for engaging said generator consisting of a plurality of tab substantially perpendicular to and extending from said first surface, said tabs contacting said outer side wall of said second end of said generator and positioning said second end of said generator with said base in contact with a central region of said second surface of said base plate, selected portions of said base plate defining a means for fastening said retainer to said wall structure of said canister,
   wherein said second end of said generator is contacted by said tabs and said side wall adjacent said second end of said generator is engaged and held in position by said tabs and said second surface of said retainer is engaged with said wall structure of said canister to secure said generator to said canister.

2. The assembly of claim 1 wherein said tabs have a first section and a second section attached to said first section wherein said second section of said tabs engage said side wall of said gas generator.

3. The assembly of claim 1 wherein said retainer is formed from carbon steel.

4. The assembly of claim 1 wherein said retainer is formed from spring steel,

5. The assembly of claim 1 wherein said base plate of said retainer is circular in shape.

6. The assembly of claim 1 wherein said base plate of said retainer further comprises a plurality of raised portions wherein said raised portions increase the rigidity of said base plate.

7. The assembly of claim 1 further comprising an aperture in the central region of said base plate.

8. An air bag restraint inflator assembly comprising:
an elongated tubular gas generator having a substantially constant cross section, said gas generator including an ignition means, said gas generator having a smooth outer side wall, a first end, and a second end, wherein said second end has a substantially smooth base substantially perpendicular to said side wall,
an air bag canister having an inside and an outside surface including a wall defining a cavity for said gas generator and at least part of a folded automotive air bag cushion, said wall further defining an opening to said cavity in said canister, said gas generator being actuatable to generate a gas under a pressure in said cavity; and a retainer comprising a base plate with a first and a second surface with means for engaging said gas generator consisting of a plurality of tabs substantially perpendicular to and extending away from said first surface of said base plate said tabs conform to and contact said second end of said gas generator to position said base of said second end of said gas generator in contact with a central region of said second surface of said base plate, selected portions of said base plate defining a fastening structure which enables said retainer base plate to be fastened to said wall of said air bag canister;

wherein said second end of said gas generator is contacted by said tabs and said base of said second end of said generator contacts said second surface of said base plate, and said base plate is engaged with said wall of said air bag canister to secure said second end of said gas generator to said air bag canister.

* * * * *